Dec. 22, 1953 — R. T. MAIORANY — 2,663,280

VERNIER INDICATING INSTRUMENT

Filed June 15, 1951 — 2 Sheets-Sheet 1

INVENTOR.
ROBERT T. MAIORANY
BY
ATTORNEY

Dec. 22, 1953  R. T. MAIORANY  2,663,280
VERNIER INDICATING INSTRUMENT
Filed June 15, 1951  2 Sheets-Sheet 2

INVENTOR.
ROBERT T. MAIORANY
BY
*James M. Nickels*
ATTORNEY

Patented Dec. 22, 1953

2,663,280

UNITED STATES PATENT OFFICE 2,663,280

VERNIER INDICATING INSTRUMENT

Robert T. Maiorany, New York, N. Y., assignor to Bendix Aviation Corporation, Teterboro, N. J., a corporation of Delaware Application June 15, 1951, Serial No. 231,884

8 Claims. (Cl. 116—129)

The present invention relates to dial instruments and more particularly to instruments with vernier type dials.

Many applications require instruments that may be read with a high degree of accuracy, yet space limitations necessitate the use of a relatively small instrument which limits the size of the dial. With a small dial, the scale thereon will be limited as to the space between the divisions, especially when the scale covers a relatively large range. Such a scale cannot be read with any degree of accuracy, especially for a fraction of a division. For example, in a system wherein it is desired to transmit into a control system small increments of an angle over a range of 180 degrees in either direction, it is necessary to be able to read the instrument indicating the angle with a high degree of accuracy. With an indicator on a single dial, it would require an extremely large dial to secure any accuracy. Space limitations would make such a structure highly impractical.

In the present invention, the reading from two scales are combined in order to obtain an accurate reading. Indications are obtained by driving two dials at a different ratio and combining the reading.

An object of the invention is to provide an improved indicating instrument.

Another object of the invention is to provide an instrument having improved vernier type dials.

Another object of the invention is to provide an instrument that can be read with a high degree of accuracy.

Another object of the invention is to provide an improved vernier type dial arrangement.

Another object of the invention is to provide an improved dial arrangement for an indicating instrument.

Another object of the invention is to provide an improved arrangement of scales in an indicating instrument that can be easily read with a high degree of accuracy.

The above and other objects and features of the invention will appear more fully hereinafter from a consideration of the following description taken in connection with the accompanying drawing wherein one embodiment of the invention is illustrated by way of example.

Figure 2:
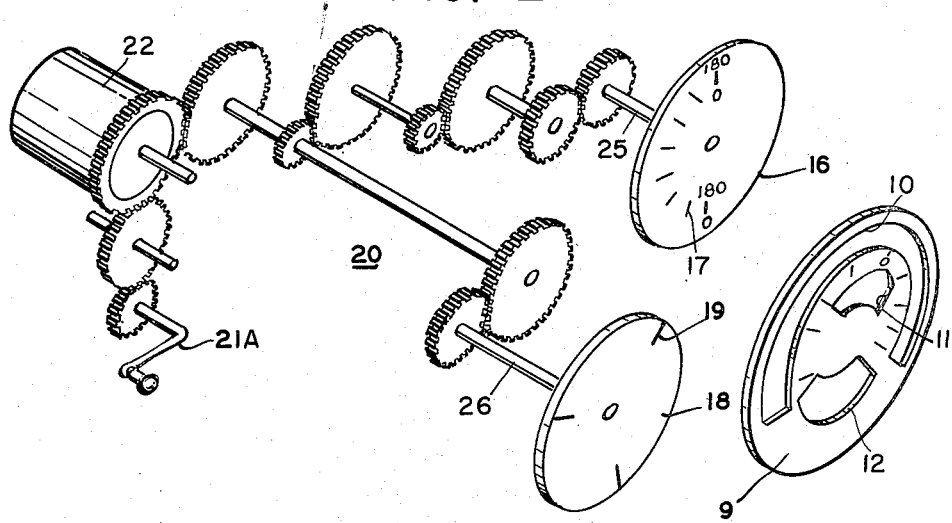
Figure 2 is a diagrammatic representation of the instrument of Figure 1.
Figure 1:
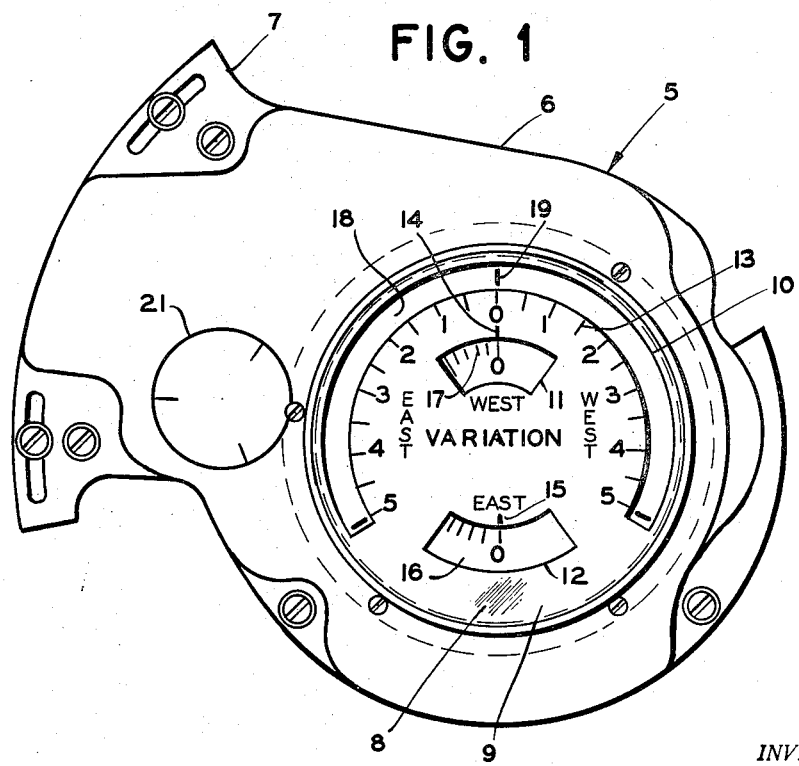
Figure 1 is a front view of an instrument embodying the invention.

Referring now to the drawings, similar parts have been given the same reference numerals in the various figures. An instrument 5 has been illustrated, by way of example, as a device for transmitting into a control system (not shown) small increments of angles, in either direction from a fixed reference. The instrument 5 is enclosed in a housing 6 having a mounting flange or base 7. The housing 6 is provided with a transparent cover or window 8.

A fixed dial 9 is positioned in the housing 6 for viewing through the window 8. The dial 9 has a large arcuate cut-out 10 and two smaller arcuate cut-outs 11 and 12. A scale 13 is placed around the inner edge of the cut-out 10. The scale 13 reads from a "zero" at the top center to a maximum indicia in either direction. In the example shown, the scale 13 is graduated from "0" to 5 with each main division further sub-divided. The devisions are such that the arc measured from "0" to 5 is one-third of a circle or 120 degrees. It is understood, however, that other divisions may be used. The dial 9 has an index or reference line 14 located adjacent the outer edge of the cut-out 11 and an index line 15 located adjacent the inner edge of the cut-out 12. The index lines of the cut-out 14 and 15 are in line with the "0" of the scale 13.

An inner movable dial 16 is positioned under the dial 9 and has a scale 17 adapted for register with the cut-outs 11 and 12. The scale 17 has graduations extending over a 180 degree range with indicia reading from "0" to a maximum indicia around the inside of the scale 17 and from the maximum indicia to "0" around the outside of the scale 17. The cut-out 11 is positioned relative to the scale 17 so that only the indicia around the inside of the scale are visible through the cut-out 11, the indicia around the outside of the scale being visible only through the cut-out 12.

An outer movable dial 18 is positioned under the dial 9 and has a scale 19 adapted for register with the cut-out 10. In the example illustrated, the scale 19 is graduated by three equi-spaced index lines which are adapted to register with the scale 13.

The dials 18 and 16 are connected through gearing 20 (see Figures 2 and 3) to setting knob 21, the latter being illustrated in Figure 2 as a crank 21A. The dials 18 and 16 are geared to be driven at a different ratio. In the example illustrated, the ratio of rotation of the dials is 24:1.

The diagrammatic representation of Figure 2 illustrates the manner in which the dials 16 and 18 are interconnected by the gearing 20 to a transmitter 22. It is understood, however, that other devices may be used.

Figure 3:
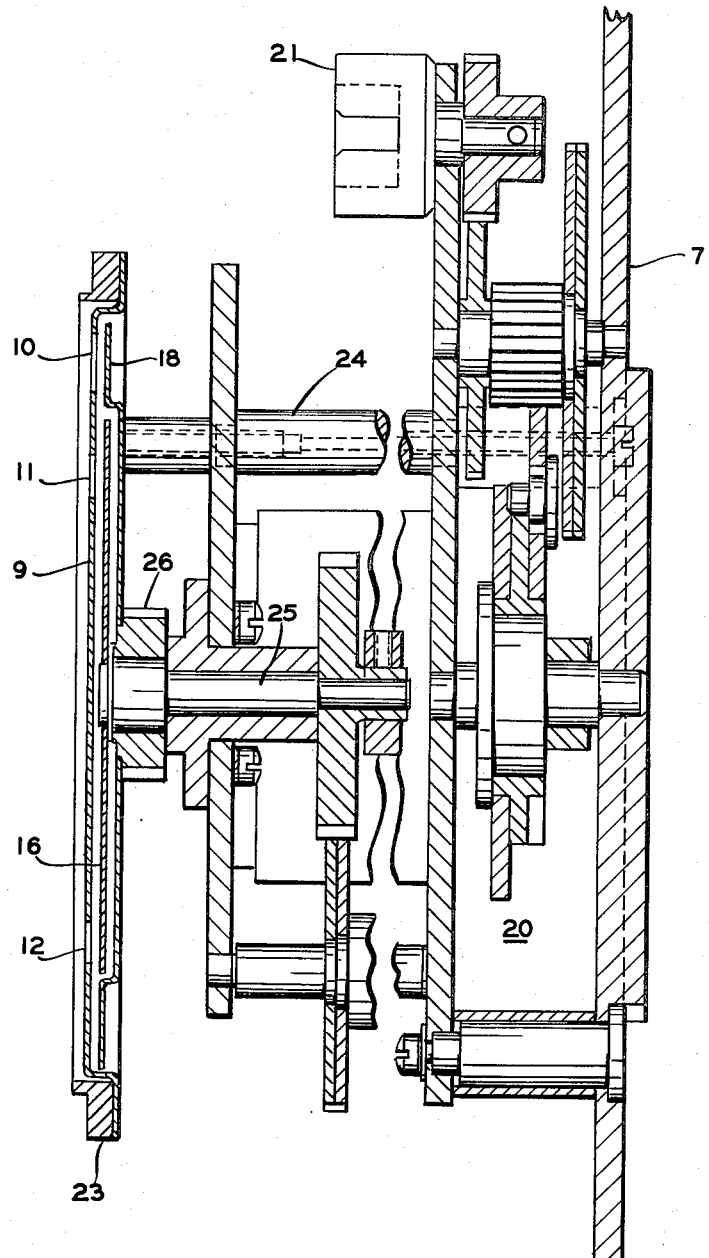
Figure 3 is an enlarged cross-sectional view of the instrument of Figure 1.

Referring now to Figure 3, the dial 9 is secured to a mounting ring 23. The ring 23 is supported by post 24 carried by the base 7. The dial 16 is secured to a shaft 25 which is connected for rotation by the gearing 20. The dial 18 is secured to a shaft 26 concentric with and surrounding the shaft 25. The shaft 26 is connected for rotation by the gearing 20 at a different ratio than that of the shaft 25. The detailed explanation of the gearing 20 has been omitted inasmuch as the ratios may be selected to fit the requirements.

In operation, at the zero setting of the instrument, the scale 17 will have the respective zeros at the index lines 14 and 15 and the dial 18 will have one of its index lines at the zero of the scale 13. Rotation of the knob 21 will rotate the dial 16 and 18 to provide an indication of the amount of rotation. The operation can best be illustrated by example. With the dials set on the zero position, it is desired to set into the system a change of 8.7 degrees in a westerly direction. The knob 21 is rotated in a direction to cause the inner dial 16 to rotate clockwise. The outer dial 18 will also rotate clockwise but at an angular ratio of 24:1 with respect to the dial 16. In the example illustrated, the divisions of the scale 17 are at 5° intervals and the range of the scale 13 is 5°. The dial 18 has three equi-spaced index lines 120° apart. It can be seen that in order to present 8.7 degrees, the index line originally at zero on the dial 18 must rotate somewhat more than 120°, and will disappear beneath the dial 9. However, a second index line will have moved to the zero and past that point to 3.7 degrees. The scale 17 will have moved to a point between the 5 and 10 marks. Adding the 5 degrees to the 3.7 degrees will give a reading of 8.7 degrees. Thus it can be seen that the coarse readings are taken from the scale 17 and combined with the fine reading from the scale 13 to provide an accurate reading.

It is noted that the scale of easterly variation has moved, in the cut-out 12 to the left away from the index line. This prevents improper reading of the setting of the device and also an indication of the direction.

Although only one embodiment of the invention has been illustrated and described, various changes in the form and relative arrangements of the parts may be made to suit requirements.

I claim:

1. An instrument of the class described comprising a fixed dial, a pair of movable dials coaxial with each other and with said fixed dial, means moving said movable dials at different speeds, and scales on said dials having reference markings cooperating with one another and corresponding to the speeds of said movable dials.

2. An instrument of the class described comprising three dials, two of said dials being movable at different speeds relative to the third dial, an index, a scale on one of said movable dials readable on said index to provide a coarse reading, a vernier scale on said third dial, and a scale on the other movable dial readable on said vernier scale to provide a vernier reading, said scales having reference markings corresponding to the speeds of said movable dials.

3. An instrument of the class described comprising three dials, two of said dials being movable at different speeds relative to the third dial, an arcuate scale on said third dial, an index, and scales on said movable dials, one of said last mentioned scales being readable on said index and the other of said last mentioned scales being readable on said arcuate scale, said scales having reference markings corresponding to the speeds of the movable dials.

4. An instrument of the class described comprising three dials, two of said dials being movable at different speeds relative to the third dial, a scale on said third dial having indicia reading from a minimum to a maximum in opposite directions from a reference line, an index, and scales on said movable dials, one of said last-mentioned scales being readable on said index and the other of said last-mentioned scales being readable on said first mentioned scale, said scales having reference markings corresponding to the speeds of said movable dials.

5. A vernier type instrument for indicating variations in direction from a reference, comprising a fixed dial having a pair of apertures therein and a vernier scale with a minimum indication representing the reference and reading in opposite directions from the reference, a movable dial positioned behind said fixed dial and having a coarse reading scale thereon viewable through one of said apertures and readable with respect to said reference, a second movable dial positioned behind said fixed dial and having a scale viewable through said other aperture and readable on said vernier scale, and means driving said movable dials at different speeds, whereby the readings from said scales are combined to provide coarse and vernier indications of the variation in directions from the reference.

6. An indicating instrument comprising three dials, one of said dials being fixed and the other two dials being mounted behind said fixed dial and movable at different speeds, an outer arcuate cutout and an inner arcuate cutout formed in said fixed dial and spaced radially from one another, a scale on said fixed dial adjacent said outer cutout, an index, a scale on one of said movable dials viewable through said inner cutout and readable on said index, and a scale on the other of said movable dials viewable through said outer cutout and readable on said first mentioned scale, the scales on said dials having reference markings corresponding to the speeds of said movable dials.

7. An instrument of the class described comprising a fixed dial having diametrically opposed arcuate cutouts, a pair of indices spaced 180 degrees from one another, a movable dial mounted behind said fixed dial and coaxial therewith, an arcuate scale extending substantially 180 degrees on said movable dial and viewable through said cut-outs with the ends of the side coinciding with the indices when said movable dial is at null position, and means for rotating said movable dial from null position in opposite directions for viewing the associated scale through only one or the other of said cutouts.

8. An instrument of the class described comprising a fixed dial having an arcuate cut-out, a scale on said fixed dial adjacent said cut-out and having indicia reading in opposite directions from a reference line on said scale, a movable dial positioned behind said fixed dial and having a second scale viewable through said cut-out and readable on said first scale, a pair of diametrically opposed inner arcuate cut-outs formed in said fixed dial, a second movable dial positioned behind said fixed dial and coaxial with said other movable dial, a third scale extending 180 degrees on said second movable dial and viewable through said opposing arcuate cut-outs, said third scale being readable with respect to the reference line on said first scale and having radially spaced indicia viewable through one or the other of said opposed arcuate cut-outs, the indicia viewable through one of said opposed arcuate cut-outs being readable with the indicia on one side of said reference line and the indicia viewable through the other of said opposed arcuate cut-outs being readable with the indicia on the other side of said reference line, and means rotating said movable dials in opposite directions for viewing the third scale through only one or the other of said opposed arcuate cutouts.

ROBERT T. MAIORANY.

References Cited in the file of this patent

UNITED STATES PATENTS

| Number | Name | Date |
|---|---|---|
| 1,092,816 | Anschutz-Kaempfe | Apr. 14, 1914 |
| 2,506,885 | Noxon | May 9, 1950 |
| 2,532,970 | Van Dyke | Dec. 5, 1950 |
| 2,539,575 | George | Jan. 30, 1951 |